Inventor
Donald B. Holland
By W. E. Lyon
Attorney

United States Patent Office 2,745,049
Patented May 8, 1956

2,745,049

PHASE SHIFT SYSTEM UTILIZING SATURABLE REACTORS AND MOTOR CONTROL UTILIZING SUCH SYSTEM

Donald B. Holland, Milwaukee, Wis., assignor to Cutler-Hammer, Inc., Milwaukee, Wis., a corporation of Delaware Application October 23, 1952, Serial No. 316,440

7 Claims. (Cl. 318—331)

My invention relates in general to phase shift systems and more particularly phase shift systems utilizing saturable reactors. Phase shift control systems of the type to be hereinafter described find extended use in controlling the relationship between armature voltage and field voltage of an adjustable voltage motor controller.

An object of the invention is the provision of a phase shift system which provides a voltage phase shift as the result of a change in D. C. energization of a saturable core reactor.

Another object of the invention is the provision of a phase shift system wherein an increase in energization of a saturable reactor effects a rearward shift in phase of the output voltage of the system.

A more specific object of the invention is the provision of a phase shift system for controlling the relationship between the armature voltage and the field voltage of a D. C. electric motor.

An even more specific object of the invention is the provision of a phase shift control system which provides high field voltage for a D. C. electric motor when starting the same, and a decrease in field voltage as the armature voltage increases beyond a predetermined value during acceleration of such motor.

The novel features which I consider characteristic of my invention are set forth with particularity in the appended claims. The invention itself, however, both as to its organization and its method of operation together with additional objects and advantages thereof, will best be understood from the following description of a specific embodiment when read in connection with the accompanying drawings in which:

Figure 1:
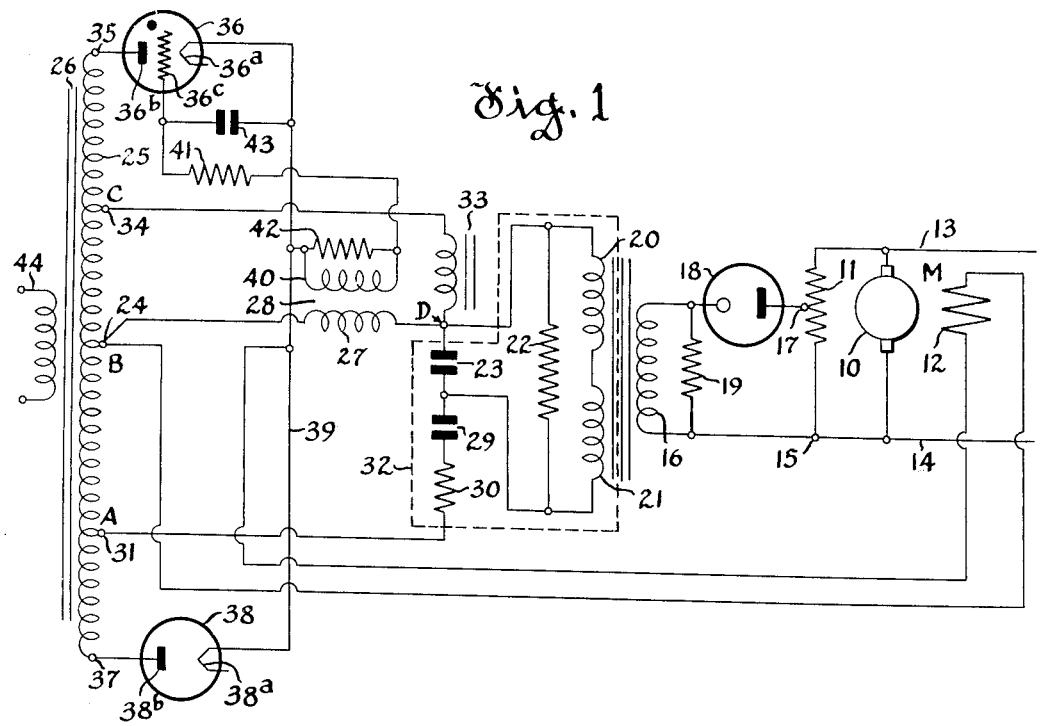
Figure 1 is a diagrammatic illustration of a portion of an adjustable voltage motor control system embodying my invention.

Referring to Fig. 1, it shows a D. C. motor M having an armature 10 and a field winding 12. The armature of said motor M is supplied, through leads 13 and 14, with an adjustable D. C. voltage such as is furnished by a D. C. generator (not shown). A resistor 11, connected in parallel with said motor armature 10, has one of its end terminals 15 connected to one end of a D. C. winding 16 of a saturable core reactor. Said resistor 11 also has an intermediate tap 17 which is connected to the other end of winding 16 through a voltage regulating tube 18. In electrical parallel relation with said reactor D. C. winding 16 is a resistor 19.

The A. C. windings 20 and 21 of the saturable core reactor are connected in electrical series relation and have connected in parallel therewith a resistor 22 and a capacitor 23. One terminal of said capacitor 23 is connected to the center tap 24 of the secondary winding 25 of a transformer 26 in series with a primary winding 27 of a grid transformer 28. The other terminal of capacitor 23 is connected in series with a capacitor 29 and a resistor 30 to an intermediate tap 31 of transformer secondary winding 25.

The components within the network enclosed by dotted line 32 constitute one leg of a phase shift circuit. Another leg of said phase shift circuit is composed of an inductance 33 which has its winding connected at one end to the point common between the transformer primary winding 27 and capacitor 23 and at its other end to an intermediate tap 34 on the secondary winding 25 of transformer 26.

Secondary winding 25 has one of its ends 35 connected to the plate $36^b$ of a gas filled electron tube 36. The other end 37 of said secondary 25 is connected to the plate $38^b$ of an ordinary diode electron tube 38. The cathodes $36^a$ and $38^a$ of said electron tubes 36 and 38, respectively, are connected together as by means of a lead 39.

The aforementioned grid transformer 28 has a secondary winding 40 connected between said lead 39 and the grid or control electrode $36^c$ of tube 36 in series with a resistor 41. A resistor 42 is connected in shunt across secondary winding 40. Connected between the cathode $36^a$ and grid $36^c$ of tube 36 is a filter capacitor 43.

The above mentioned field winding 12 of motor M is connected between the center tap 24 of transformer secondary 25 and the lead 39. Transformer 26 is provided with a primary winding 44 which is connectable to any suitable source of alternating current power supply.

As the motor M is started from rest, as by means of increasing the voltage output of its associated D. C. generator, a small amount of D. C. current is supplied to the motor armature. The small amount of current flowing through motor armature 10, provides such a small voltage drop across resistor 11 that regulator tube 18 cannot conduct. The size of said tube 18 is preferably selected so that no current will flow through winding 16 until motor M approaches base speed.

Figure 3:
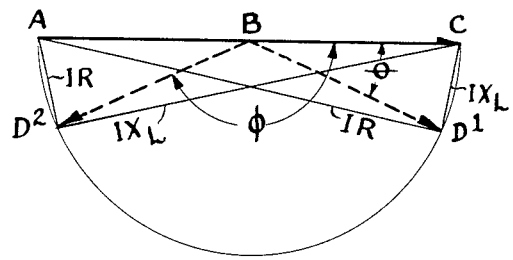
Fig. 3 is a vector diagram illustrating the relationship of certain voltages in the operation of the system of Fig. 1.

During this period when no current flows through winding 16, the A. C. windings 20 and 21 of the saturable core reactor have their maximum A. C. inductance. In this condition, such windings in parallel with capacitor 23 produce a high resistive impedance so that network 32, one branch of the phase shift circuit, appears as a high resistance. The other branch of said circuit is pure inductance 33. Such combination of inductance and resistance values causes a current flow through the load circuit comprising primary 27 of transformer 28; which current flow impresses a voltage on the grid $35^c$ of tube 36 nearly in time phase with the voltage applied to the plate $36^b$ thereof. Fig. 3 shows this phase relation. The vector A–C indicates the voltage applied to the plate $36^b$ of tube 36, while the vector B–D¹ indicates the voltage applied to the grid $36^c$ thereof when the IR drop (vector A–D¹) is large as compared with the IX$_L$ drop (vector C–D¹). With box 32 appearing as a high resistance the phase difference between the plate and grid voltages of tube 36 is seen to be represented by angle $\theta$.

Figure 2:
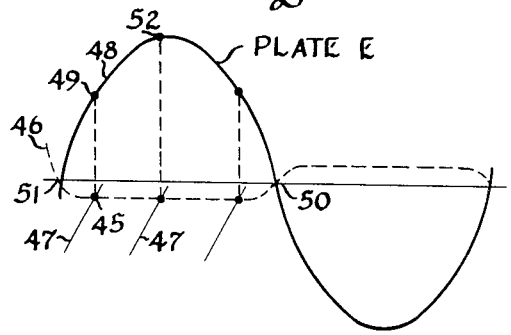
Fig. 2 is a chart of characteristic curves which serve to illustrate the invention.

Referring to Fig. 2, it is seen that under these conditions said tube 36 begins to conduct at point 45, which is the intersection of the critical grid voltage curve 46 and the actual grid voltage curve 47; the latter of which is almost in phase with the plate voltage curve 48. It is thus seen that tube 36 will conduct when its plate voltage reaches a value indicated by point 49. Tube 36 will continue to conduct until its plate voltage swings in a negative direction as represented by point 50. During such negative swing of the plate voltage of tube 36, a positive plate voltage is supplied to tube 38, thereby causing it to conduct. It is, therefore, seen that either tube 36 or 38 will be conducting so as to supply electrical energy to field winding 12, except for a short interval when the plate of tube 36 swings in the positive direction before reaching the plate potential indicated by point 49.

When the armature voltage on motor M exceeds a predetermined value so that tube 18 begins to conduct, the D. C. winding 16 of the saturable core reactor will have current flow therethrough, thus changing the impedance of said saturable core reactor. The A. C. winding impedance of said saturable core reactor decreases, thus causing the resistive impedance of box 32 to also decrease. As seen in Fig. 3, this decrease in resistive impedance causes the voltage developed across primary 27 of transformer 28 to be more out-of-phase with the voltage applied to the plate $36^b$ of tube 36. With the Ir drop very small (vector A–$D^2$) as compared with the $IX_L$ drop (vector C–$D^3$), it is seen that a voltage represented by vector B–$D^2$ is impressed on the grid of tube 36. It is further noted that the phase angle between said grid voltage and the plate voltage (vector A–C) is now quite large as represented by angle $\phi$ of Fig. 3. As the actual grid voltage curve 47 shifts to the right, as shown in Fig. 2, the electron tube 36 will not begin to conduct until a higher plate voltage is realized as represented by point 52. It is thus seen that tube 36 will conduct only while the plate voltage is between points 52 and 50 (Fig. 2). It is further seen that neither tubes 36 nor 38 will conduct while the plate voltage on tube 36 is swinging positive from point 51 to point 52. Such condition, of course, produces less effective current flow through field winding 12. It is also apparent that as the armature voltage of motor 10 continues to increase, the current flow through winding 16 also increases, thereby decreasing the resistive impedance of box 32 and causing the grid voltage of tube 36 to be more and more out of phase with the voltage applied to the plate thereof.

When the armature voltage of motor 10 reaches its base speed rated armature voltage the D. C. current flowing through winding 16 becomes constant, thereby causing a flow of a constant value of current through the field winding 12.

It is thus seen that my invention provides a change in field current inversely proportional to the change in current flow through the D. C. winding of a saturable core reactor. An increase in current flow through the D. C. winding causes the grid voltage to shift out of phase with the plate voltage as applied to an electronic control tube.

Although I have shown and described a specific embodiment of my invention, I am fully aware that many modifications thereof are possible. My invention, therefore, is not to be restricted except in so far as necessitated by the prior art and by the spirit of the appended claims.

I claim:

1. A phase shifting network comprising, a transformer winding having three taps, one of which is intermediate the others, an inductive circuit connected to one of said outer taps, a circuit comprising a saturable reactor having an A. C. winding connected to the other of said outer taps and to said inductive circuit, and a load circuit between said intermediate tap and a juncture of the aforementioned circuits, said saturable reactor having a D. C. winding energizable to effect variation of the impedance of the circuit comprising said A. C. winding to thereby vary the phase relation between the voltage across said load circuit and the voltage across said transformer winding.

2. A phase shifting network comprising, a transformer winding having outer taps and an intermediate tap, an inductive circuit connected to one of said outer taps, a circuit comprising a saturable reactor having an A. C. winding in parallel with a resistor and a capacitor, said last mentioned circuit being connected to the other of said outer taps and to said inductive circuit, and a load circuit between said intermediate tap and the juncture of the aforementioned circuits, said saturable reactor having a D. C. winding energizable to effect variation of the electrical resistance of the circuit comprising said A. C. winding to thereby vary the phase relation between the voltage across said load circuit and the voltage across said transformer winding.

3. In a phase shift network having a circuit in which variation of electrical resistance effects a shift in phase, the combination comprising a saturable reactor having its A. C. windings connected in series relation to each other in said circuit, a resistor and a capacitor each in parallel relation with said windings, and a second resistor and a second capacitor in series relation with each other and with said winding and each of the first mentioned resistor and capacitor, said circuit varying in electrical resistance as the degree of saturation of said reactor is varied.

4. In combination, a D. C. motor, a source of adjustable voltage in circuit with the armature of said motor, means for supplying the field winding of said motor with rectified A. C. including a grid controlled electron tube for regulation, and a phase shift circuit including a saturable reactor having a saturating winding associated with the armature of said motor for varying the saturation of said reactor as the energization of the motor armature is varied, an A. C. winding effective to vary the phase of the voltage applied to the grid of said electron tube as the saturation of said reactor is varied and means responsive to energization of the motor armature for preventing saturation of said saturating winding unless said motor armature is energized more than a preselected amount.

5. In combination, a D. C. motor, a source of adjustable voltage in circuit with the armature of said motor, means for supplying the field winding of said motor with rectified A. C. including a grid controlled electron tube for regulation, and a phase shift circuit including a saturable reactor having a saturating winding associated with the armature of said motor for varying the saturation of said reactor as the energization of the motor armature is varied and A. C. windings in electrical series arrangement, and further including a resistor and a capacitor each in parallel relation with said reactor A. C. windings to vary the phase of the voltage applied to the grid of said electron tube as the saturation of said reactor is varied and means responsive to energization of the motor armature for preventing saturation of said saturating winding unless said motor armature is energized more than a pre-selected amount.

6. In combination, a D. C. motor, a source of adjustable voltage in circuit with the armature of said motor, means for supplying the field winding of said motor with rectified A. C. including a grid controlled electron tube for regulation and a phase shift circuit including a saturable reactor having a saturating winding in circuit with the armature of said motor for effecting an increase in the saturation of said reactor as the energization of the motor armature is increased and an A. C. winding to effect rearward movement of the phase of the voltage applied to the grid of said electron tube as the saturation of said reactor is increased and means in circuit with said saturating winding to render the same effective only while said motor armature energization exceeds a predetermined value.

7. In combination, a D. C. motor, a source of adjustable voltage in circuit with the armature of said motor, means for supplying the field winding of said motor with rectified A. C. including a grid controlled electron tube for regulation, a phase shift circuit including a saturable reactor having a saturating winding in circuit with the armature of said motor for effecting an increase in the saturation of said reactor as the energization of the motor armature is increased and an A. C. winding to effect rearward movement of the phase of the voltage applied to the grid of said electron tube as the saturation of said reactor is increased, and means in circuit with said saturating winding to render the same effective only while motor armature energization exceeds a predetermined value.

References Cited in the file of this patent

UNITED STATES PATENTS

| | | |
|---|---|---|
| 1,851,692 | Zucker | Mar. 29, 1932 |
| 1,985,634 | Fleming | Dec. 25, 1934 |
| 2,229,968 | Garman | Jan. 28, 1941 |
| 2,235,551 | Garman | Mar. 18, 1941 |
| 2,609,524 | Greene | Sept. 2, 1952 |